(12) United States Patent
Guenther et al.

(10) Patent No.: US 9,095,098 B2
(45) Date of Patent: Aug. 4, 2015

(54) WORK APPARATUS

(71) Applicant: Andreas Stihl AG & Co. KG, Waiblingen (DE)

(72) Inventors: David Guenther, Waiblingen (DE); Antonio Fattorusso, Kernen-Stetten (DE); Juergen Haeberlein, Murrhardt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 13/784,100

(22) Filed: Mar. 4, 2013

(65) Prior Publication Data

US 2013/0228350 A1 Sep. 5, 2013

(30) Foreign Application Priority Data

Mar. 2, 2012 (DE) .......................... 10 2012 004 037

(51) Int. Cl.
*A01G 3/06* (2006.01)

(52) U.S. Cl.
CPC ....................................... *A01G 3/062* (2013.01)

(58) Field of Classification Search
CPC ...................................................... A01G 3/062
USPC ..................... 172/13, 15, 17; 83/478; 56/12.7
See application file for complete search history.

(56) References Cited

U.S. PATENT DOCUMENTS

| 672,536 | A | | 4/1901 | Newton |
| 882,353 | A | | 3/1908 | Speirs |
| 2,654,180 | A | | 10/1953 | Redfield |
| 3,102,376 | A | | 9/1963 | Henderson |
| 3,217,812 | A | | 11/1965 | Gallion |
| 3,221,483 | A | * | 12/1965 | Ronning .......................... 56/12.7 |
| 3,378,995 | A | * | 4/1968 | Welsh ........................... 56/320.1 |
| 3,750,378 | A | * | 8/1973 | Thorud et al. .................. 56/10.5 |
| 4,030,277 | A | * | 6/1977 | Christopherson ............ 56/320.1 |
| 4,072,195 | A | | 2/1978 | Carlson |
| 4,085,570 | A | * | 4/1978 | Joray et al. ............................ 56/2 |
| 5,101,617 | A | * | 4/1992 | Hare et al. ...................... 56/17.4 |
| 5,327,649 | A | * | 7/1994 | Skinner .............................. 30/124 |
| D357,482 | S | | 4/1995 | Forbush |
| 5,407,012 | A | | 4/1995 | Kloepfer |

(Continued)

FOREIGN PATENT DOCUMENTS

| DE | 297 09 152 U1 | 8/1997 |
| DE | 299 05 704 U1 | 6/1999 |

*Primary Examiner* — Thomas B Will
*Assistant Examiner* — Jessica H Lutz
(74) *Attorney, Agent, or Firm* — Walter Ottesen P.A.

(57) ABSTRACT

A handheld work apparatus such as a bed redefiner or edger has a handle for guiding the work apparatus over the ground. The apparatus also includes a drive motor which drives a tool in rotation. During operation, the apparatus is moved over the ground by the operator in a direction of movement. The tool is covered at least partially by a protective hood and a sliding skid is arranged on that end of the protective hood located at the front in the direction of movement. The sliding skid has an abutment surface for a flexible spray guard fixed to the protective hood. The spray guard is fastened to the protective hood in its fastening region located at the front viewed in the direction of movement. The spray guard is movable in its protective region located at the rear viewed in the direction of movement.

21 Claims, 6 Drawing Sheets

(56) References Cited

U.S. PATENT DOCUMENTS

| | | | |
|---|---|---|---|
| 5,490,371 A * | 2/1996 | Potucek, III | .......... 56/17.2 |
| 5,890,292 A | 4/1999 | Stark et al. | |
| 6,302,219 B1 | 10/2001 | Filippini | |
| 6,615,928 B2 | 9/2003 | Dueitt | |
| 6,688,404 B2 | 2/2004 | Uhl et al. | |
| 8,522,518 B2 * | 9/2013 | Hirose et al. | .......... 56/17.4 |
| 2009/0255695 A1 * | 10/2009 | Breneman et al. | .......... 172/15 |
| 2013/0228351 A1 | 9/2013 | Stark et al. | |

* cited by examiner

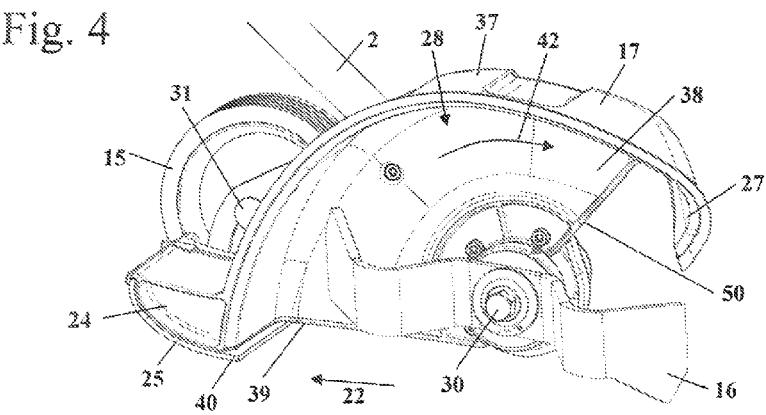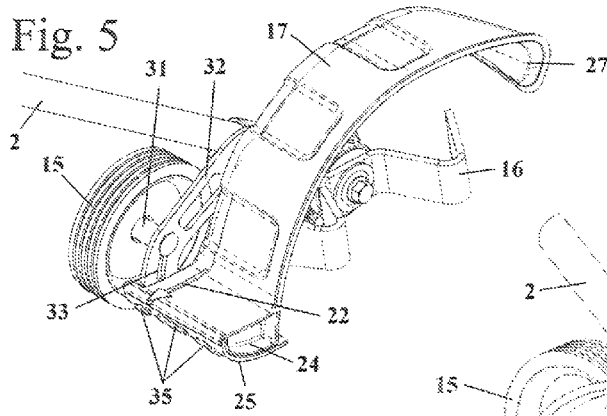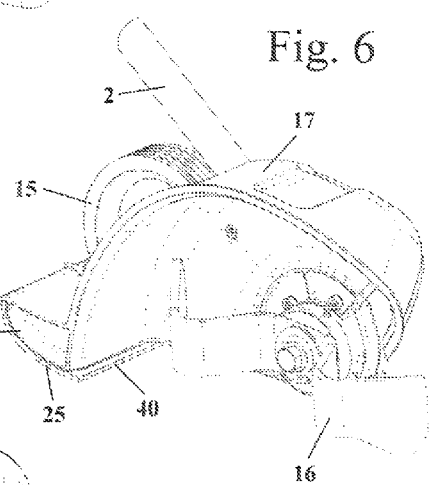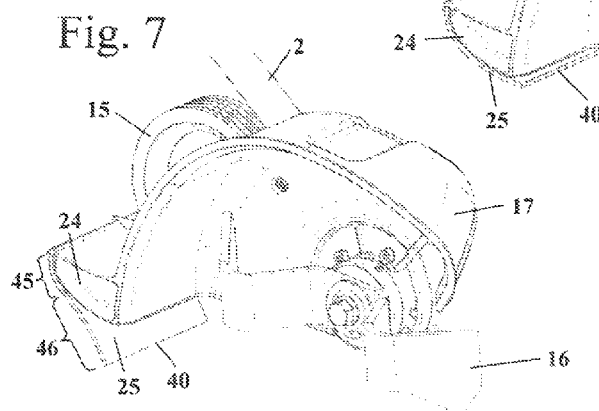

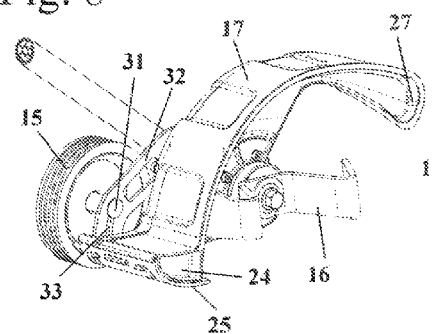
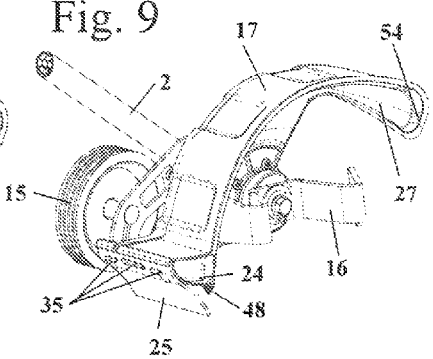
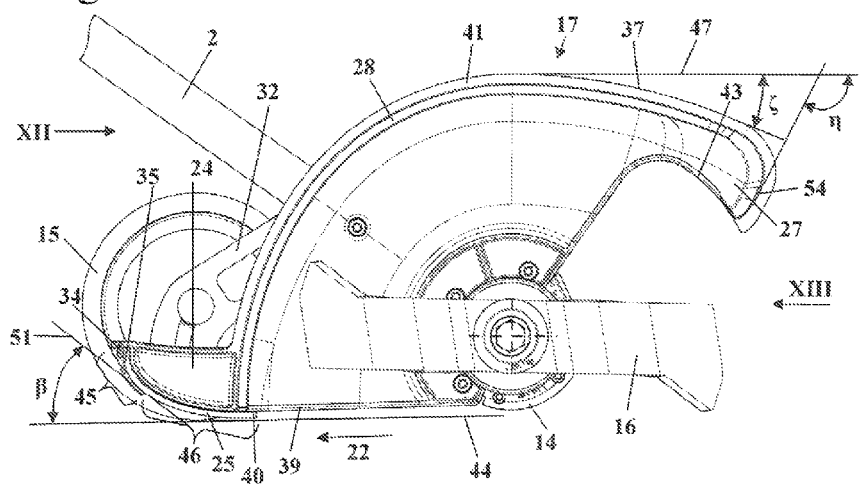
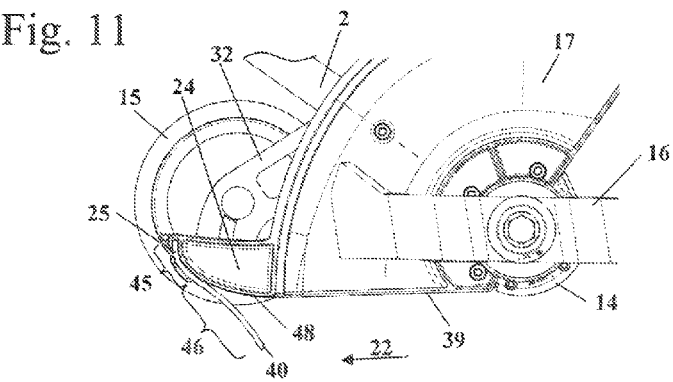

WORK APPARATUS

CROSS REFERENCE TO RELATED APPLICATION

This application, claims priority of German patent application no. 10 2012 004 037.7, filed Mar. 2, 2012, the entire content of which is incorporated herein by reference.

BACKGROUND OF THE INVENTION

DE 299 05 704 U1 discloses a portable edge cutter, on the cutting head housing of which there is formed a sliding skid. The skid sliding or the ground prevents wear on the cutting head.

U.S. Pat. No. 5,890,292 discloses a cut-off grinder, the cut-off disk of which is covered by a protective hood. The protective hood has a sliding piece which slides over the surface of the workpiece during operation.

U.S. Pat. No. 5,407,012 shows a hand-held edge cutter which is pulled over the ground by the operator during operation. On the side facing the operator, the protective hood of the edge cutter carries a spray guard made of a flexible material. The spray guard is oriented toward the front in the direction of movement. It has been shown that the spray guard can flap down toward the rear during operation, and as a result, the spray guard is subjected to high mechanical loading and the force required to move the work apparatus increases.

SUMMARY OF THE INVENTION

It is an object of the invention to provide a work apparatus of the general kind described above which has a long service life and great ease of use.

The work apparatus of the invention is configured to be moved by an operator in a movement direction. The work apparatus includes: a handle configured for guiding the work apparatus over the ground in the movement direction; a work tool; a drive motor configured to drive the work tool in rotation; a protective hood having a forward end with respect to the direction of the movement and configured to at least partially cover the work tool; a sliding skid disposed on the front end of the protective hood; a flexible spray guard having an attachment section lying forward when viewed with respect to the movement direction; the flexible spray guard being attached to the protective hood at the attachment section; the flexible spray guard further having a movable protective section lying rearward when viewed in the movement direction; and, the sliding skid having a contact surface for receiving the movable protective section thereagainst during the operation of the work apparatus.

An abutment or contact surface for the spray guard is formed on the sliding skid. The spray guard is, in this case, fastened to the protective hood in its attachment section that is located at the front in the direction of movement. The protective section that is located at the rear in the direction of movement is free to move. Because the spray guard is already oriented in the direction of movement and the free end of the spray guard projects toward the rear viewed in the direction of movement, flapping down of the spray guard during operation is reliably avoided. The contact sure face which is formed on the sliding skid likewise leads to low mechanical loading of the spray guard and thus to a long service life. The sliding skid having the spray guard arranged thereon makes it possible to work comfortably with low expenditure of effort, since the work apparatus can be pulled easily over the ground.

Advantageously, the rotation axis of the tool is arranged approximately parallel to the ground during operation. It has been shown that the proposed arrangement of the spray guard is particularly advantageous in the case of work apparatuses having a tool rotation axis oriented approximately parallel to the ground during operation, for example furrow cutters, lawn edge cutters or the like.

During operation, the contact surface extends advantageously, with respect to the direction of movement, toward the rear and downwardly, that is, in the direction toward the ground. This ensures that the spray guard is always oriented toward the rear viewed in the direction of movement and the free end of the spray guard is arranged at the rear in the direction of movement. Flapping down such that the free end of the spray guard flaps over from a region located in front of the fastening region in the direction of movement into a region located behind the fastening region in the direction of movement is prevented in a simple manner as a result.

Advantageously, the spray guard extends in an inclined manner to the ground at the transition from the attachment section to the protective section. In this region, the spray guard advantageously encloses with the ground an angle which opens toward the front in the direction of movement and which is advantageously less than about 75°, in particular less than about 60°. An angle of about 45° is considered to be particularly advantageous. The angle is, in this case, measured between the spray guard and the surface of the ground. On account of the flat setting angle of the spray guard at the transition from the attachment section to the protective section, excessive bending of the spray guard when it is placed against the contact surface is prevented. The spray guard is placed gradually against the contact surface. If the spray guard lifts off the contact surface, the orientation of the contact surface at the transition from the attachment section to the protective section ensures that the spray guard is oriented toward the rear with respect to the direction of movement.

Advantageously, in the event of full abutment against the sliding skid, the free end, located at the rear in the direction of movement, of the spray guard projects beyond the contact surface. The end of the spray guard that is located at the front in the direction of movement is advantageously retained in a retaining groove in the protective hood. Simple fastening is obtained when at least one fastening nub fixed to the sliding skid projects through the spray guard in the fastening region. As a result, the spray guard can be detached easily from the sliding skid and replaced. The fastening nub projects in particular through an opening in the spray guard. The fastening nub is advantageously fitted into the opening. It is practical to provide a plurality of fastening nubs and a plurality of openings. Alternatively or in addition, it may be provided for the spray guard to be held on the protective hood via at least one fastening screw.

In order to ensure a good spray protection function, it is provided for the spray guard, to extend approximately over the entire width, measured parallel to the rotation axis, of the protective hood. A simple structure is produced when the sliding skid is formed in one piece with the protective hood. On account of the fact that the sliding skid is covered at least partially by the spray guard, only low wear of the sliding skid occurs during operation, and so it is not as a rule necessary to replace the sliding skid.

Advantageously, the work apparatus has a wheel which is arranged laterally next to the sliding skid in the direction of movement. By changing the position of the wheel, it is advantageously possible to set the operating height, that is, in particular the position of a handle of the work apparatus. As a result, the work apparatus is easily adaptable to the height of an operator. To this end, the position of the wheel is advantageously adjustable in a direction perpendicular to the ground. When the position of the wheel is changed, the sliding skid can lift off the ground. Because the spray guard is movable in its protective region located at the rear in the direction of movement, good spray protection is ensured for every possible position of the wheel. A gap that arises between the ground and the sliding skid is bridged by the spray guard. It may also be provided that the cutting depth of the work apparatus is set via the position of the wheel.

The tool is advantageously a blade, in particular a blade for soil cultivation. A good work result is achieved when the blade moves forward in the ground in the direction of movement. Earth excavated by the blade is conveyed along the protective hood toward the rear viewed in the direction of movement. Advantageously, on that end of the protective hood that is located at the rear in the direction of movement, a guide surface is formed which guides material conveyed by the tool, for example earth, in the direction of movement laterally next to the protective hood. As a result, lateral ejection of the material, for example earth, is achieved in a simple manner. Ejected material is prevented from passing back onto the area cultivated by the cutter. The configuration and arrangement of the guide surface is advantageous independent of the configuration of the sliding skid and independent of a spray guard.

Advantageously, the guide surface encloses an angle of about 15° to about 60° with the rotation axis, in plan view of the cutting head. In this case, the plan view of the cutting head denotes a direction perpendicular to the ground from above. Here, the plan view relates to the position of the work apparatus in operation. The mentioned inclination of the guide surface conveys excavated earth and the like laterally to the rear and ensures that the excavated earth cannot pass back into the excavated furrow. Advantageously, the rear edge of the guide surface encloses an angle of about 10° to about 40° with the rotation axis of the tool, in a view of the cutting head from below. The view from below relates in this case to the normal position of the work apparatus in operation and describes a viewing direction perpendicularly upward from the ground. Because the rear edge of the guide surface extends more flatly with respect to the rotation axis, an open channel, through which the earth is conveyed, is formed. The flat course of the guide surface at the rear edge prevents earth from passing directly downward from the guide surface and back into the furrow.

The protective hood is preferably made of plastics material. In order to avoid excessive wear during operation, it is advantageously provided for the protective hood to have a wear protection on its inner side facing the blade. The wear protection is advantageously likewise made of plastics material. The wear protection is produced in particular together with the protective hood in a two-component injection-molding process. This results in a simple structure, good bonding of the wear protection to the protective hood and a small number of required components. Fastening elements for fastening the wear protection to the protective hood are not needed.

BRIEF DESCRIPTION OF THE DRAWINGS

The invention will now be described with reference to the drawings wherein:

FIGS. 3 to 6 show perspective views of the cutting head of the furrow cutter;

FIG. 7 shows the perspective view from FIG. 6 with the spray guard projecting partially downward;

FIG. 8 shows a further perspective illustration of the cutting head of the furrow cutter;

FIG. 9 shows the cutting head of FIG. 8 with the spray guard projecting partially downward;

FIG. 10 shows a side elevation view of the cutting head;

FIG. 11 shows the cutting head of FIG. 10 with the spray guard projecting partially downward;

DESCRIPTION OF THE PREFERRED
EMBODIMENTS OF THE INVENTION

Figure 1:
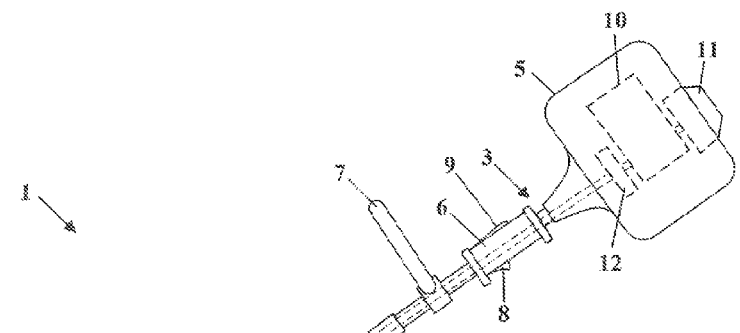
FIG. 1 shows a schematic side elevation view of a furrow cutter.

FIG. 1 shows a furrow cutter 1 as an exemplary of a handheld work apparatus. Such furrow cutters, also known as bed redefiners, are used in order to plow a furrow between a lawn area and adjoining bed areas or the like and thus to create a clear boundary between these areas. However, the present invention can also be used in other work apparatuses, for example in edge cutters (edgers) or other work apparatuses that are moved over the ground, for example brush cutters.

The furrow cutter 1 has a guide tube 2, first end 3 on which a motor housing 5 is fixed. In normal operation, the first end is the upper end. At the other, second end 4, which faces the ground 44 during operation, there is arranged a cutting head 49. A handle 6, which engages around the guide tube 2, is fixed to the guide tube 2 adjacent to the motor housing 5. A throttle lever 8 and a throttle lever lock 9 are arranged on the handle 6. Further operating elements can also be arranged on the handle 6. On the side of the handle 6 that faces the cutting head 49, a bale handle 7 is arranged on the guide tube 2 at a short distance from the handle 6. By way of the handle 6 and the bale handle 7, an operator can guide the furrow cutter 1 and pull it in a direction of movement 22 over the ground 44. FIG. 1 shows the furrow cutter 1 in the normal operating position.

Arranged in the motor housing 5 is a drive motor 10, which is an internal combustion engine in the embodiment shown. During operation, the drive motor 10 is arranged ahead of the cutting head 49 in the direction of movement 22. However, the drive motor 10 can also foe an electrically driven motor. Arranged on the drive motor 10 is a starter device 11 which is advantageously a pull-rope starter. The drive motor 10 is connected, via a centrifugal clutch 12, to a driveshaft 13 which projects through the guide tube 2. The driveshaft 13 drives a tool, specifically a blade 16, in rotation about a rotation axis 21 via an angular transmission (not shown) which is arranged in a transmission housing 14. The rotation axis 21 extends perpendicularly to the longitudinal direction of the guide tube 2. The rotation axis 21 extends approximately parallel to the ground 44 in the normal operating position of the furrow cutter 1. The transmission housing 14 is part of the cutting head 49.

The inclination of the guide tube 2 in the normal operating position is determined by the transmission housing 14, which rests on the ground 44, and by the position of the wheel 15. The blade 16 is partially covered by a protective hood 17. The protective hood 17 extends predominantly on that side of the blade 16 that faces the operator, that is to say in front of and above the blade 16 in the direction of movement 22. On the end that is at the end viewed in the direction of movement 22, the protective hood 17 has a guide surface 27. A wheel 15 is arranged adjacent to the protective hood 17 in that region of the protective hood 17 that is at the front in the direction of movement 22. The wheel 15 rolls over the ground 44 during operation. During operation, the wheel 15 is arranged in front of the rotation axis 21 in the direction of movement 22.

Figure 2:
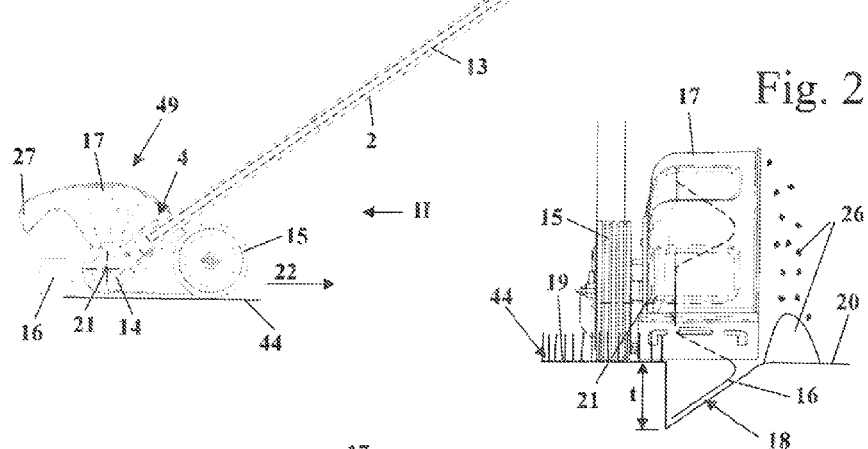
FIG. 2 shows a schematic of the furrow cutter from FIG. 1 in the direction of the arrow II in FIG. 1.

As FIG. 2 shows, the wheel 15 is advantageously moved over a lawn area 19, specifically such that the blade 16 is arranged between the lawn area 19 and an adjacent bed area 20. In this case, the cutting head 49 is pulled by the operator over the ground 44. The operator walks in front of the cutting head 49. During operation, the blade 16 creates a furrow 18, which has a depth (t). The furrow 18 advantageously extends perpendicularly to the ground 44 on the side adjacent to the lawn area 19 and inclined at an angle on the side adjoining the bed area 20. The geometry of the cross section of the furrow 18 is determined by the geometry of the blade 16. As FIG. 2 shows, the earth 26 excavated from the furrow 18 is conveyed laterally next to the protective hood 17 and is ejected in the region of the bed area 20. This takes place via the guide surface 27 as will be described in more detail hereinafter.

Figure 3:
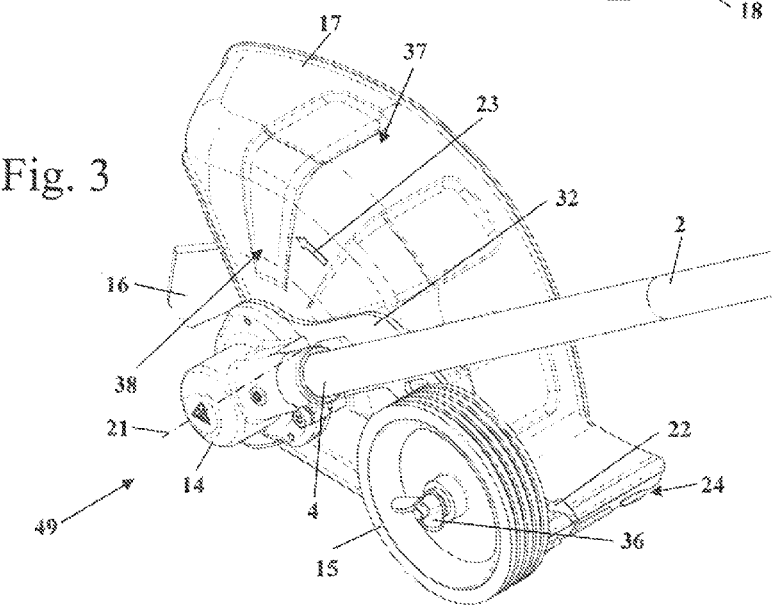

As FIG. 3 shows, the protective hood 17 has a peripheral wall 37 which extends largely approximately in the form of a circular arc around the rotation axis 21 of the blade 16, and also a side wall 38 which extends approximately perpendicularly to the rotation axis 21 on the side facing the lawn area 19. The protective hood 17 has an arrow which points in the direction of movement 22. This arrow is arranged adjacent to the wheel 15 in the region of a sliding skid 24 integrally formed on the protective hood 17. A further arrow 23, which indicates the direction of rotation of the blade 16, is provided on the side wall 38 of the protective hood 17. The direction of rotation 23 is oriented such that the blade 16 moves in the direction of movement 22 in the ground and counter to the direction of movement 22 on the side arranged above the rotation axis 21, so that earth is conveyed toward the rear in the protective hood 17. This is indicated by the arrow 42 in FIG. 4. The blade 16 is held on a driveshaft (not shown) via a fastening screw 30.

Figure 13:
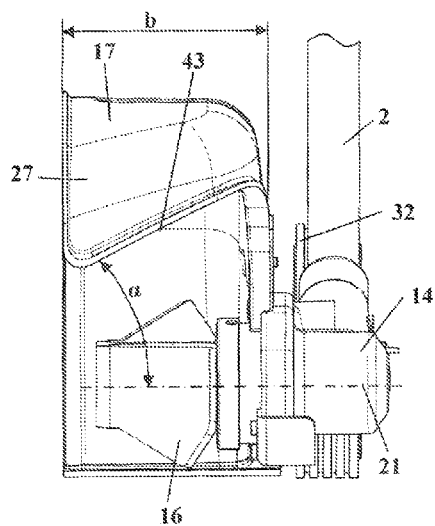
FIG. 13 shows a side elevation view in the direction of the arrow XIII in FIG. 10.

As FIG. 4 shows, the side wall 38 has a side edge 50 which extends at the top toward the rear in the direction of movement 22. The protective hood 17 has a lower edge 39 which delimits the side wall 38 and which extends approximately parallel to the ground 44. The peripheral wall 37 extends, in its region at the rear in the direction of movement 22, approximately tangentially to the movement, indicated by the arrow 42, of the ejected earth. The peripheral wall 37 transitions, in its rear region, into the guide surface 27, which is directed downward in a narrow curve. The guide surface 27 extends inwardly in its lower region, so that the distance of the guide surface 27 from the rotation axis 21 becomes smaller in this region. As a result, the guide surface 27 delimits a partially open ejection channel via which the earth is ejected. As FIG. 13 shows, the rear edge 43 of the peripheral wall 37 of the protective hood 17 extends in a manner dropping downward to the open side facing the bed area 20, in a view from the rear in a viewing direction parallel to the ground 44. In the shown viewing direction parallel to the ground, the rear edge 43 encloses an angle α of advantageously about 20° to about 60° with the rotation axis 21 of the blade 16. In the embodiment, the angle α is about 30°. As a result, the ejected earth is guided toward the ground. The indicated view relates in this case to a normal operating position of the furrow cutter 1.

Figure 14:
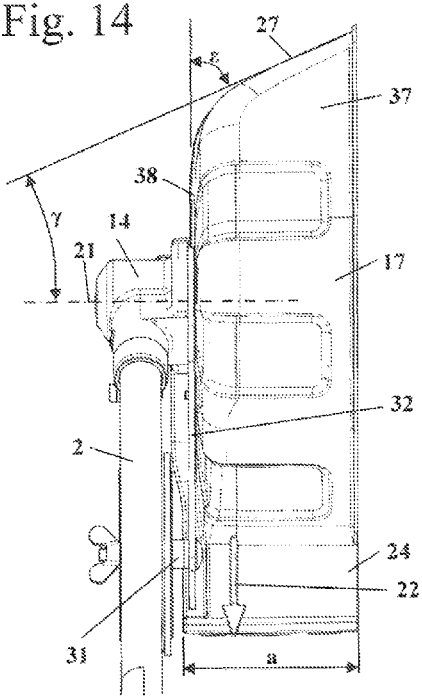
FIG. 14 shows a plan view of the cutting head in the direction of the arrow XIV of FIG. 12.
Figure 15:
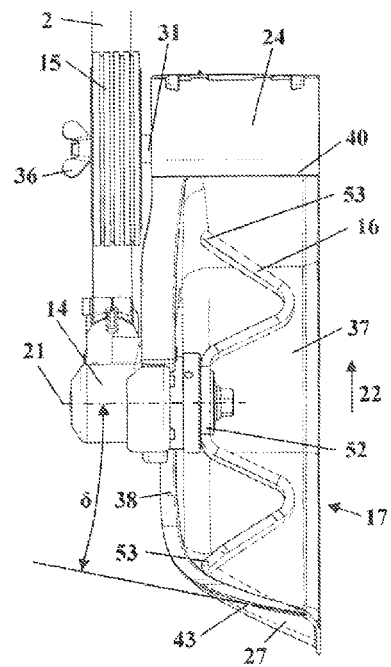
FIG. 15 shows a view of the cutting head from below in the direction of the arrow XV in FIG. 12.

As FIGS. 14 and 15 show, the guide surface 27 extends toward the rear with respect to the direction of movement 22 and recedes further away from the rotation axis 21 with increasing distance from the side wall 38. In the plan view of the cutting head 49 shown in FIG. 14, in the normal operating position of the furrow cutter 1, the guide surface 27 encloses an angle γ of advantageously about 15° to about 60° with the rotation axis 21. The plan view is in this case a view from above in a viewing direction perpendicular to the ground. In the embodiment, the angle γ is about 25°. In the plan view shown in FIG. 14, the guide surface 27 encloses an angle ε of advantageously about 30° to about 75° with the side wall 38. In the embodiment, the angle ε is about 65°. In this case, the region of the guide surface 27 in which the angles γ and ε are measured is the region located at the rear with respect to the direction of movement 22. The indicated angles are in this case advantageously provided in at least one normal operating position of the furrow cutter 1. Advantageously, angles which lie in the stated ranges of values arise in every normal operating position of the furrow cutter 1.

As FIG. 15 shows, the guide surface 27 extends at its rear edge 43 more flatly with respect to the rotation axis 21. The rear edge 43, which is visible from below in the view shown in FIG. 15, encloses an angle δ of about 10° to about 40° with the rotation axis 21. In the embodiment, the angle δ is about 10° to 15°. The inclination of the guide surface 27 with respect to the rotation axis 21 ensures that excavated earth is conveyed laterally next to a plowed furrow.

In a normal operating position of the furrow cutter 1, the angle α is measured in a plane which extends perpendicularly to the ground 44 and parallel to the rotation axis 21. The angles β, γ, δ and ε are measured in planes which extend parallel to the ground 44. The corresponding edges of the furrow cutter 1 are projected in this case into the corresponding planes, specifically in a direction perpendicular to the corresponding plane.

FIGS. 4 and 5 show the mounting of the wheel 15 in detail. The wheel 15 is held on a mounting plate 32 by way of a wheel axle 31. The wheel axle 31 is advantageously a screw, which is screwed into the fastening nut 36 shown in FIG. 15. The wheel axle 31 extends through a longitudinal slot 33 (FIG. 5) in the mounting plate 32. The longitudinal slot 33 extends approximately perpendicularly to the ground 44 in an arc. By changing the position of the wheel axle 31 in the longitudinal slot 33, the operating height can be set. When the position of the wheel axle 31 is changed, the inclined position of the guide tube 2 (FIG. 1) changes, since the furrow cutter 1 rests on the ground in the region of the transmission housing 14. As a result, the position of the handle 6 and of the bale handle 7 changes. By changing the position of the wheel axle 31, the operating position of the furrow cutter 1 can be changed. All operating positions which arise in provided positions of the wheel axle 31, that is, in positions of the wheel axle 31 in the longitudinal slot 33 when the furrow cutter 1 is placed with the transmission housing 14 and the wheel 15 on flat, horizontal ground 44, are normal operating positions.

The inner side of the protective hood 17 is lined with a wear protection means 28. The protective hood 17 consists advantageously of plastics material, and the wear protection means 28 is produced together with the protective hood 17 in a two-component injection-molding process. As FIG. 10 shows, the protective hood 17 has a main body 41, to which the wear protection means 28 is applied. On the front side of the protective hood 17 in the direction of movement 22, the sliding skid 24 is arranged on the protective hood 17, and, in particular, is integrally formed thereon. Fixed to the sliding skid 24 is a spray guard 25. The sliding skid 24 has the abutment or contact surface 48, visible in FIGS. 9 and 11, against which the spray guard 25 can be placed during operation.

FIGS. 5, 9, 10 and 12 show the fastening of the spray guard 25 to the sliding skid 24. That end of the spray guard 25 that is located at the front in the direction of movement 22 is retained in a retaining groove 34 in the sliding skid 24. Beneath the retaining groove 34, the sliding skid 24 has, in the embodiment, three retaining nubs 35, which protrude as elevations from the abutment surface 48. The spray guard 25 is formed as a flexible, approximately rectangular sheet. The retaining nubs 35 project through correspondingly formed openings in the spray guard 25. The retaining nubs 35 prevent the spray guard 25 from slipping out of the retaining groove 34. As a result, the spray guard 25 is fixed to the sliding skid 24 in a form-fitting manner.

The retaining nubs 35 and the retaining groove 34 are arranged in a fastening region 45 of the spray guard (FIGS. 7 and 10). In the fastening region 45, the spray guard 25 is retained firmly on the sliding skid 24. This is adjoined by a protective region 46 in which the spray guard 25 can move away from the abutment surface 48. During operation, the spray guard 25 can flap downward by way of its protective region 46, as FIGS. 7, 9 and 11 show. This is advantageous in particular when the sliding skid 24, on account of the cutting height set, does not slide along the ground 44 and only the wheel 15 is in contact with the ground. The spray guard 25 prevents earth from being ejected forward between the protective hood 17 and the ground 44. As FIGS. 4 and 10 show, the free end 40 of the spray guard 25 projects toward the rear beyond the sliding skid 24 when the spray guard 25 lies completely, that is, as much as possible, against the abutment surface 48 (FIGS. 9 and 11) of the sliding skid 24.

The fastening region 45 is located in front of the protective region 46 with respect to the direction of movement 22. This ensures that, the protective region 46 is always arranged behind the fastening region 45 in the direction of movement 22, specifically, irrespective of whether the spray guard 25 is resting against the abutment surface 48 or not.

FIG. 10 shows the orientation of the abutment surface 48 (FIG. 9) in a direction parallel to the rotation axis 21 in detail. At the transition from the fastening region 45 to the protective region 46, the spray guard 25 extends tangentially to an imaginary plane 51 which encloses an angle $\beta$ with the ground 44. The angle $\beta$ is advantageously less than about 75°, in particular, less than about 60°. An angle $\beta$ of about 45° has been found to be particularly advantageous. On account of the flat orientation of the spray guard 25 at the transition from, the fastening region 45 to the protective region 46, the free end 40 of the spray guard 25 is reliably prevented from flapping down toward the front in the direction of movement 22. The abutment surface 48 extends, as FIGS. 4 to 11 show, in a manner curved approximately in the form of a parabola. Adjacent to the retaining groove 34, the abutment surface 48 extends approximately perpendicularly and adjacent to the free end 40 of the spray guard 25 approximately parallel to the ground 44. The angle $\beta$ is also located in the indicated range in at least one normal operating position, in particular in all normal operating positions.

FIG. 10 also shows the orientation of the protective hood 17 in the region located at the rear in the direction of travel 22. The protective hood 17 extends downwardly, that is, in the direction of the ground 44, in its region located at the rear in the direction of travel 22. The peripheral wall 37 of the protective hood 17 extends in a manner inclined at an angle $\zeta$ of advantageously more than 0° to a horizontal 47 which extends parallel to the ground 44. As a result, excavated earth is guided toward the ground. The angle $\zeta$ is advantageously about 10° to about 60°, in particular about 15° to about 40°. The peripheral wall 37 is adjoined by the guide surface 27, which advantageously likewise extends in the direction toward the ground. The guide surface 27 has an end edge 54 which is also shown in FIG. 9. At the end edge 54, excavated earth emerges from the protective hood 17. The end edge 54 of the guide surface 27 encloses an angle $\eta$ of advantageously much more than 0° with the horizontal 47. The angle $\eta$ is advantageously at least 60°, in particular more than 90°. Advantageously, the angle $\eta$ is about 100° to about 140°. The angle $\eta$ is in this case measured from the guide surface 27 toward the rear with respect to the direction of travel 22. An angle $\eta$ of more than 90° accordingly means that the end edge 54 of the guide surface 27 extends downwardly and toward the front with respect to the direction of travel 22. All of the stated angular ranges relate in this case to at least one, in particular all normal operating positions of the furrow cutter 1. The peripheral wall 37 and the guide surface 27 are oriented such that excavated earth is guided to the ground in a targeted manner and close to the cutting head 49 of the furrow cutter 1.

Figure 12:
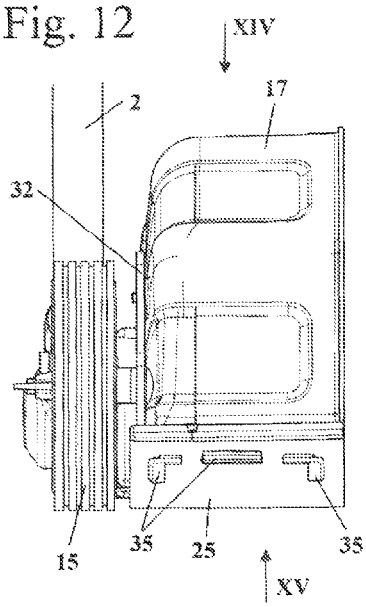
FIG. 12 shows a side view in the direction of the arrow XII in FIG. 10.

FIGS. 12 to 15 show the arrangement of the mounting plate 32 in a plane between the wheel 15 and the protective hood 17. The shape of the retaining nubs 35 is also shown in FIG. 12. The mounting plate 32 is fixed to the transmission housing 14. The blade 16 extends in a movement plane in the central region of the protective hood 17. The protective hood 17 has a width (b), which corresponds approximately to the width (a) of the sliding skid 24 and of the spray guard 25 (FIG. 14). The width (a) and the width (b) are in this case measured parallel to the rotation axis 21.

As FIG. 15 shows, the blade 16 is approximately W-shaped. The free ends of the blade 16 are located in the same plane, facing the transmission housing 14, as the central fastening region 52. Between the fastening region 52 and the free ends 53 of the blade 16, V-shaped sections extend on that side of the fastening region 52 that is remote from the transmission housing 14.

Figure 16:
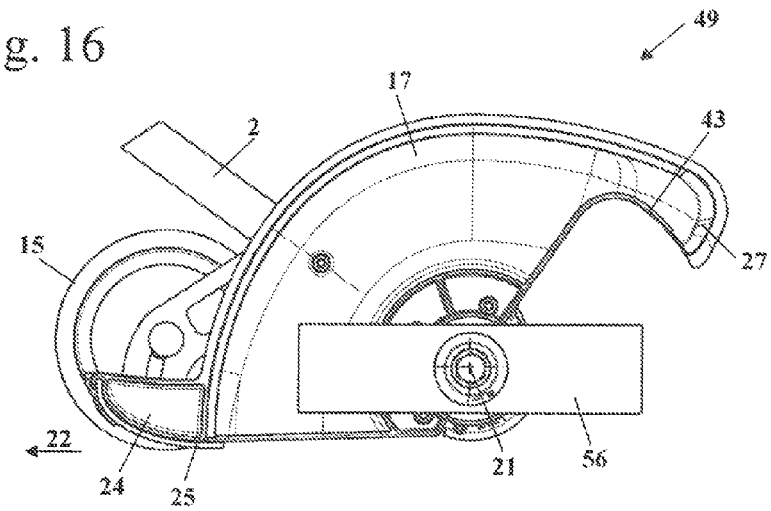
FIG. 16 shows a side view of the cutting head of an edge cutter.

FIG. 16 shows the cutting head 49 having a blade 56 which is used to cut lawn edges. On account of the arrangement of a blade 56 on the cutting head 49, the furrow cutter 1 can be used as a lawn edge cutter (edger). The blade 56 is advantageously formed in a planar and rectangular manner. The shown form of the protective hood 17 having the guide surface 27 is advantageous in the case of use with a blade 56 for cutting lawn edges, too. The spray guard 25 prevents earth from being ejected in the direction of the user in the case of a blade 56 for cutting lawn edges, too. The cutting head 49 is also moved with a blade 56 in the direction of movement 22, that is, pulled by the operator over the ground, wherein the operator and the wheel 15 are arranged in front of the blade 56 in the direction of movement 22. The rotation axis 21 is oriented approximately parallel to the ground.

Figure 17:
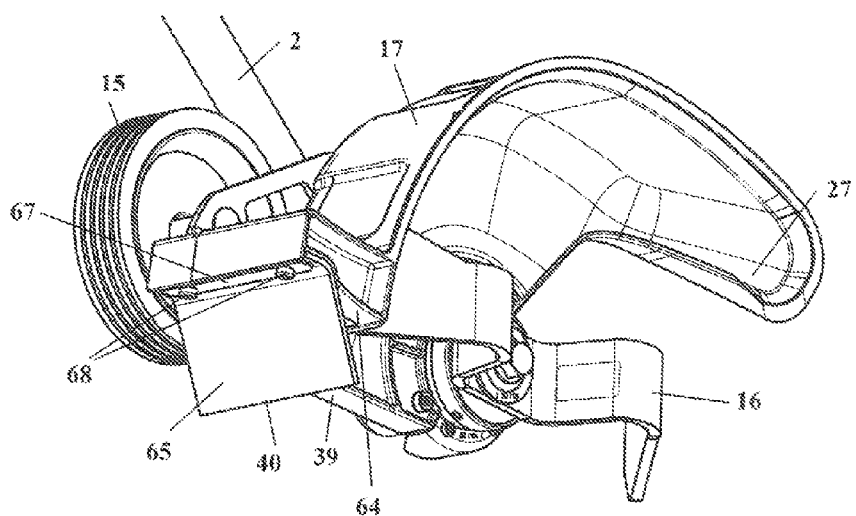
FIG. 17 shows a perspective illustration of an exemplary embodiment of a cutting head of a furrow cutter.
Figure 18:
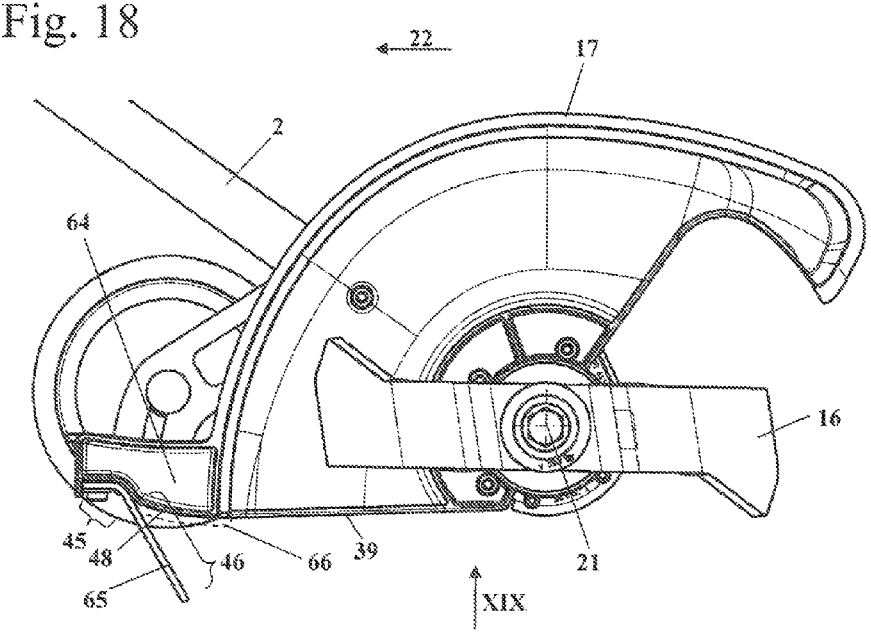
FIG. 18 shows a side elevation view of the cutting head from FIG. 17.
Figure 19:
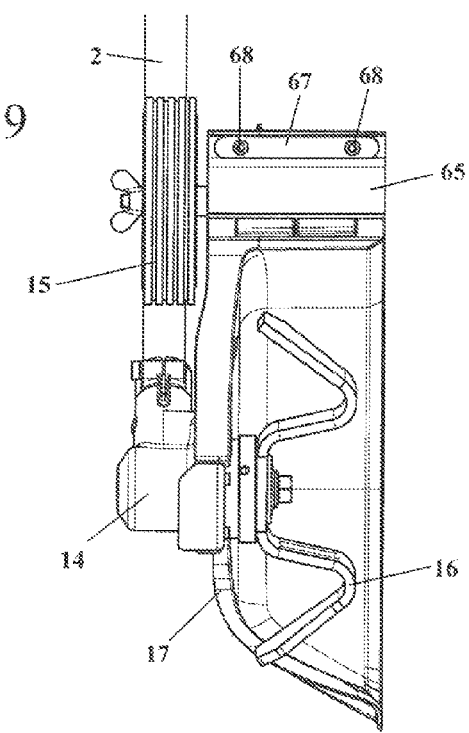
FIG. 19 shows a view of the cutting head from below in the direction of the arrow XIX in FIG. 18.

FIGS. 17 to 19 show an embodiment of a cutting head of a furrow cutter. The same reference signs as in the previous drawings identify corresponding elements. The furrow cutter shown in FIGS. 17 to 19 differs by way of the fastening of the spray guard 65 to the sliding skid 64 of the protective hood 17 and also by way of the design of the sliding skid 64. The different design of the sliding skid 64 is produced here as a result of the different fastening. As FIGS. 17 to 19 show, the spray guard 65 is fixed to the sliding skid 64 in its region located at the front in the direction of movement 22 via two fastening screws 68 shown in FIG. 19. Arranged between the heads of the fastening screws 68 and the flexible material of the spray guard 65 is a crosspiece 67 which is formed for example as a thin metal sheet. The crosspiece 67 prevents the spray guard 65 from pulling out at the fastening screws 68 and also fixes that region of the spray guard 65 that is arranged between the fastening screws 68 to the sliding skid 64. Instead of the crosspiece 67, it is also possible to arrange washers at the fastening screws 68. A different number of fastening screws 68 can also be advantageous.

As FIG. 18 shows, the protective region 46 of the spray guard 65 projects downward counter to the direction, of movement 22. The angle which the protective region 46 encloses with the ground (not shown in FIG. 18) corresponds to the angle β shown in FIG. 10. As a result, the protective region 46 projects downwardly and toward the rear with respect to the direction of movement 22. The fastening region 45 is formed approximately horizontally adjacent to the fastening screws 68 and extends in a curved manner in the region adjoining the fastening screws 68. That region of the sliding skid 64 to which the spray guard 65 is fastened transitions by way of a bend into the abutment surface 48 for the protective region 46, The width of the fastening region 45 is dependent on the flexibility of the spray guard 65 in the embodiment shown. Advantageously, the spray guard 65 is so rigid there is rests against the sliding skid 64 up to the bend in the sliding skid 64.

In FIG. 18, the spray guard 65 is indicated in the state resting against the sliding skid 64 by way of a dashed line 66. As FIG. 18 shows, the spray guard 65 projects in this position beyond the abutment surface 48 of the sliding skid 64 by way of its free end located at the rear in the direction of movement 22.

It is understood that the foregoing description is that of the preferred embodiments of the invention and that various changes and modifications may be made thereto without departing from the spirit and scope of the invention as defined in the appended claims.

What is claimed is:
1. A work apparatus configured to be moved by an operator in a movement direction, the work apparatus comprising:
a handle configured for pulling the work apparatus over the ground in said movement direction;
a work tool;
said handle being arranged ahead of said work tool with respect to said movement direction;
a drive motor configured to drive said work tool in rotation;
a protective hood having a forward end with respect to the movement direction and configured to at least partially cover said work tool;
said protective hood including a sliding skid disposed on said forward end thereof;
said sliding skid having a contact surface facing toward the ground during the operation of said work apparatus;
a flexible spray guard attached to said protective hood;
said flexible spray guard having an attachment section where at said flexible spray guard is attached to said protective hood;
said flexible spray guard further having a protective section which is configured to lie at least partially against said contact surface during operation of said work apparatus;
said work apparatus having a state wherein said protective section lies at least partially against said contact surface and wherein said protective section lies between said contact surface and the ground during operation of said work apparatus;
said protective section lying behind said attachment section in said movement direction in said state such that a flipping over of said flexible spray guard is reliably prevented; and,
said flexible spray guard being movable at said protective section and being fixedly attached to said work apparatus exclusively via said attachment section.
2. The work apparatus of claim 1, wherein said contact surface, during operation of the work apparatus, runs rearward and downward with respect to said movement direction.
3. The work apparatus of claim 1, wherein said protective section and said attachment section conjointly define a transition therebetween; and, said spray guard and the ground conjointly define an angle β, which opens frontally in said movement direction and is less than approximately 75°.
4. The work apparatus of claim 3, wherein said angle β is less than approximately 60°.
5. The work apparatus of claim 1, wherein said spray guard has a free end disposed rearward with respect to said movement direction which projects beyond said contact surface when said spray guard is in full contact with said sliding skid.
6. The work apparatus of claim 1, wherein said protective hood has a retaining groove; said attachment section defines a front end of said spray guard viewed in said movement direction; and, said front end of said spray guard is held in said retaining groove.
7. The work apparatus of claim 1, further comprising at least one retaining nub fixed on said sliding skid and configured to project through said spray guard in said attachment section.
8. The work apparatus of claim 1, further comprising at least one fastening screw configured to hold said spray guard on said protective hood.
9. The work apparatus of claim 1, wherein said work tool defines a rotational axis; said protective hood has a width (b) which is measured parallel to said rotational axis;
and, said spray guard extends over approximately the entirety of said width (b).
10. The work apparatus of claim 1, wherein said sliding skid is formed as one piece with said protective hood.
11. The work apparatus of claim 1, further comprising a wheel arranged laterally adjacent to said sliding skid with respect to the movement direction.
12. The work apparatus of claim 11, further comprising a mount defining an elongated slot running approximately perpendicularly to the ground; and, said wheel having a wheel axle accommodated in said slot and said wheel axle being adjustable in position in said elongated slot.
13. The work apparatus of claim 1, wherein said work tool is a blade.
14. The work apparatus of claim 1, wherein said work tool is a blade configured for tilling the ground.
15. The work apparatus of claim 14, wherein said blade is configured to move forward in the ground in the movement direction.
16. The work apparatus of claim 1, wherein said work tool defines a rotational axis; and, said protective hood has a rear end viewed with respect to said movement direction and said rear end terminates in a region above said rotational axis.
17. The work apparatus of claim 1, wherein said protective hood is made of plastic, has an inner side facing said work tool and a wear protection disposed on said inner side.
18. The work apparatus of claim 1, wherein said protective section lies completely behind said attachment section with respect to said movement direction when said work apparatus is in said state wherein said protective section lies at least partially against said contact surface and wherein said pro- tective section lies between said contact surface and the ground during operation of said work apparatus.

19. A work apparatus configured to be moved by an operator in a movement direction, the work apparatus comprising:
- a handle configured for guiding and pulling the work apparatus over the ground in said movement direction;
- a work tool defining a rotational axis;
- said handle being arranged ahead of said work tool with respect to said movement direction;
- a drive motor configured to drive said work tool in rotation;
- a protective hood having a forward end with respect to the movement direction and configured to at least partially cover said work tool;
- said protective hood including a sliding skid disposed on said forward end thereof;
- said protective hood having a rear end portion viewed with respect to said movement direction and said protective hood having a guide surface arranged at said rear end portion;
- said work tool being configured to move material;
- said guide surface and said rotational axis conjointly defining an angle Y measured in a plane parallel to the ground; and,
- said angle Y being at least approximately 15° for at least one position of said work apparatus during operation thereof so as to guide the material conveyed by said work tool in said movement direction laterally so that said material lands adjacent to said protective hood.

20. The work apparatus of claim 19, wherein said angle Y is approximately 15° to 60° for at least one position of said work apparatus during operation thereof.

21. The work apparatus of claim 19, wherein said sliding skid has a contact surface; and, wherein said work apparatus further comprises a flexible spray guard attached to said protective hood;
- said flexible spray guard has an attachment section lying forward when viewed with respect to said movement direction and said flexible spray guard is attached to said protective hood at said attachment section; and,
- said flexible spray guard has a protective section lying rearward when viewed in said movement direction and said flexible spray guard is configured to be movable at said protective section.

* * * * *

UNITED STATES PATENT AND TRADEMARK OFFICE
CERTIFICATE OF CORRECTION

PATENT NO. : 9,095,098 B2  
APPLICATION NO. : 13/784100  
DATED : August 4, 2015  
INVENTOR(S) : D. Guenther et al.

Page 1 of 1

It is certified that error appears in the above-identified patent and that said Letters Patent is hereby corrected as shown below:

In the Specification

In column 1:
Line 14: delete "or" and substitute -- on -- therefor.
Line 62: delete "sure face" and substitute -- surface -- therefor.

In column 4:
Line 59: delete "foe" and substitute -- be -- therefor.

In column 9:
Line 29: delete "there is" and substitute -- that it -- therefor.

In the Claims

In column 11:
Line 21: delete "Y" and substitute -- $\gamma$ -- therefor.

In column 12:
Line 1: delete "Y" and substitute -- $\gamma$ -- therefor.
Line 6: delete "Y" and substitute -- $\gamma$ -- therefor.

Signed and Sealed this
Twenty-eighth Day of June, 2016

Michelle K. Lee
*Director of the United States Patent and Trademark Office*